(12) United States Patent
Matsuo et al.

(10) Patent No.: US 9,786,884 B2
(45) Date of Patent: Oct. 10, 2017

(54) METHOD AND APPARATUS FOR PRODUCING BATTERY SEPARATOR ROLL

(71) Applicant: SUMITOMO CHEMICAL COMPANY, LIMITED, Tokyo (JP)

(72) Inventors: Takahiro Matsuo, Niihama (JP); Satoshi Yoneyama, Niihama (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 0 days.

(21) Appl. No.: 14/780,681

(22) PCT Filed: Feb. 9, 2015

(86) PCT No.: PCT/JP2015/053544
§ 371 (c)(1),
(2) Date: Sep. 28, 2015

(87) PCT Pub. No.: WO2016/056256
PCT Pub. Date: Apr. 14, 2016

(65) Prior Publication Data
US 2016/0308183 A1  Oct. 20, 2016

(30) Foreign Application Priority Data

Oct. 10, 2014  (JP) ................. 2014-209413

(51) Int. Cl.
*B65H 35/02* (2006.01)
*B32B 37/02* (2006.01)
(Continued)

(52) U.S. Cl.
CPC ......... *H01M 2/145* (2013.01); *B32B 37/1284* (2013.01); *B32B 39/00* (2013.01);
(Continued)

(58) Field of Classification Search
None
See application file for complete search history.

(56) References Cited

U.S. PATENT DOCUMENTS 6,972,066 B2 * 12/2005 Ishikawa ................. B41J 31/00
156/187
2002/0132162 A1  9/2002 Takata et al.
(Continued)

FOREIGN PATENT DOCUMENTS

CN  201498560 U  6/2010
JP  5-182656 A   7/1993
(Continued)

OTHER PUBLICATIONS

Japanese Office Action for Jp Application No. 2015-509232 dated Apr. 7, 2015.
(Continued)

*Primary Examiner* — Linda L Gray
(74) *Attorney, Agent, or Firm* — Sughrue Mion, PLLC

(57) ABSTRACT

The present invention provides a long separator roll. A method according to the present invention for producing a battery separator roll includes a connecting step of connecting two or more separators (12b and 12c) to each other along a lengthwise direction so that the battery separator roll is produced.

4 Claims, 14 Drawing Sheets

(51) Int. Cl.
*B32B 38/04* (2006.01)
*B29C 65/50* (2006.01)
*H01M 2/14* (2006.01)
*B32B 37/12* (2006.01)
*B32B 39/00* (2006.01)
*H01M 2/16* (2006.01)
*B32B 38/00* (2006.01)
*B32B 38/10* (2006.01)
*B65H 18/14* (2006.01)
*B32B 38/18* (2006.01)
*H01M 10/0525* (2010.01)

(52) U.S. Cl.
CPC ....... *H01M 2/1653* (2013.01); *H01M 2/1686* (2013.01); *B29C 65/50* (2013.01); *B32B 37/02* (2013.01); *B32B 38/0004* (2013.01); *B32B 38/10* (2013.01); *B32B 38/185* (2013.01); *B65H 18/145* (2013.01); *B65H 35/02* (2013.01); *H01M 2/166* (2013.01); *H01M 10/0525* (2013.01); *Y10T 156/1066* (2015.01); *Y10T 156/1075* (2015.01); *Y10T 156/1079* (2015.01); *Y10T 156/1087* (2015.01)

(56) References Cited

U.S. PATENT DOCUMENTS

| | | |
|---|---|---|
| 2012/0064385 A1 | 3/2012 | Park |
| 2013/0236767 A1 | 9/2013 | Nishikawa et al. |
| 2014/0361065 A1 | 12/2014 | Ishimatsu et al. |

FOREIGN PATENT DOCUMENTS

| | | |
|---|---|---|
| JP | 6-84675 U | 12/1994 |
| JP | 06-104507 B2 | 12/1994 |
| JP | 774065 A | 3/1995 |
| JP | 8-17419 A | 1/1996 |
| JP | 10144339 A | 5/1998 |
| JP | 2000233856 A | 8/2000 |
| JP | 2001-283812 A | 10/2001 |
| JP | 2002-273684 A | 9/2002 |
| JP | 2006-88255 A | 4/2006 |
| JP | 2007191306 A | 8/2007 |
| JP | 2007191307 A | 8/2007 |
| JP | 2012-59696 A | 3/2012 |
| JP | 2012-114075 A | 6/2012 |
| JP | 5188970 B2 | 4/2013 |
| JP | 2013-80563 A | 5/2013 |
| JP | 2013-137619 A | 7/2013 |
| JP | 2013165024 A | 8/2013 |
| JP | 2013227073 A | 11/2013 |
| JP | 2014-3002 A | 1/2014 |
| JP | 2014-137907 A | 7/2014 |
| JP | 2014158016 A | 8/2014 |
| JP | 3194816 U | 12/2014 |
| JP | 3194817 U | 12/2014 |
| WO | 2008/013114 A1 | 1/2008 |
| WO | 2012147665 A1 | 11/2012 |

OTHER PUBLICATIONS

International Search Report for PCT/JP2015/053544 dated Mar. 31, 2015 [PCT/ISA/210].
International Search Report dated Dec. 8, 2015, issued by the International Bureau in corresponding International Application No. PCT/JP2015/077520.
Communication dated Aug. 10, 2016, issued by the Korean Intellectual Property Office in corresponding Korean Application No. 10-2016-7013999.
Communication dated Nov. 22, 2016, from the Japanese Patent Office in counterpart application No. 2016-546060.
Communication dated Dec. 21, 2016 issued by the Korean Intellectual Property Office in Corresponding Korean Application No. 10-2016-7013999.
Communication dated Sep. 13, 2016, issued by the Japan Patent Office in corresponding Japanese Application No. 2016-546060.
Korean Office Action mailed Apr. 18, 2017 for Application No. 10-2016-7013999.
Product Winning Jang Yong-Shil Award in 39th Week of 2012—F1 LG Chem High-Performance Safety Reinforced Separator.
International Preliminary Report on patentability of PCT/JP2015/053544, Apr. 20, 2017.
International Preliminary Report on Patentability of PCT/JP2015/077520, Apr. 20, 2017.

\* cited by examiner

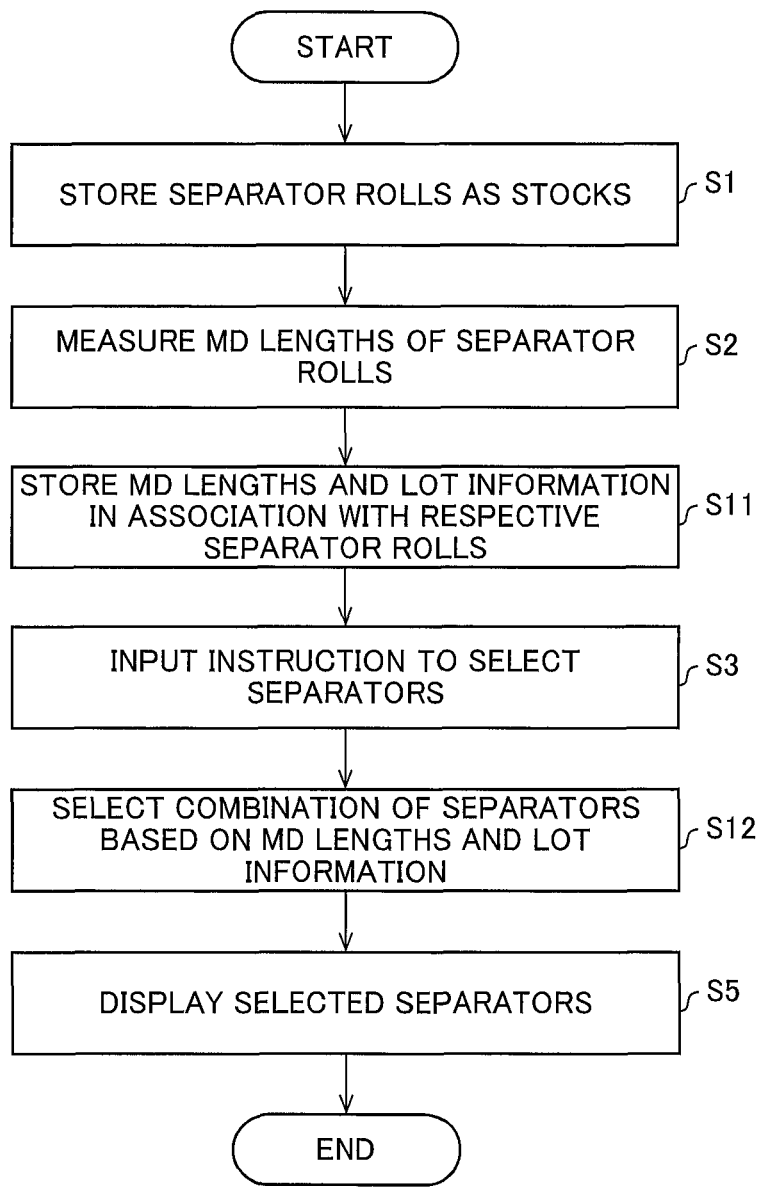

METHOD AND APPARATUS FOR PRODUCING BATTERY SEPARATOR ROLL

CROSS REFERENCE TO RELATED APPLICATIONS

This application is a National Stage of International Application No. PCT/JP2015/053544 filed Feb. 9, 2015, claiming priority based on Japanese Patent Application No. 2014-209413 filed Oct. 10, 2014, the contents of all of which are incorporated herein by reference in their entirety.

TECHNICAL FIELD

The present invention relates to a battery separator roll, and a method for producing the battery separator roll, and the like.

BACKGROUND ART

A lithium-ion secondary battery includes therein a positive electrode and a negative electrode which are separated by a battery separator. In production of secondary batteries, a separator roll is used. The separator roll is obtained by rolling up a film separator. Because the secondary batteries vary in shape and size, a wide separator original sheet having been produced is slit in accordance with a width of a secondary battery. As a result, the wide original separator sheet is processed into a plurality of separator rolls. Then, the separator rolls each are rewound so as to be sandwiched between a film positive electrode and a film negative electrode, so that these electrodes and the separator are laminated.

Patent Literature 1 discloses a technique according to which a thickness of a separator is controlled by measuring an outer diameter of a separator roll.

CITATION LIST

Patent Literature

[Patent Literature 1]
PCT International Publication No. WO 2008/013114 (Publication Date: Jan. 31, 2008)

SUMMARY OF INVENTION

Technical Problem

In production of secondary batteries, a separator is rewound together with electrodes. Therefore, in view of production efficiency, it is preferable that a separator roll and sheet-form electrode rolls have an equal length in a lengthwise direction (in a direction in which the separator roll and the electrode rolls are to be rewound). An original sheet of the separator is a porous film, and stretched in production steps. Accordingly, in some cases, the separator is broken in the production steps. Depending on a position where the separator is broken, a length of the separator roll changes in the lengthwise direction. In conventional techniques, such breakage of the separator in production of the separator roll is not taken into account.

An object of the present invention is to provide a long separator roll.

Solution to Problem

A method according to one aspect of the present invention for producing a battery separator roll includes: a connecting step of connecting two or more battery separators to each other along a lengthwise direction so that the battery separator roll is produced.

A battery separator roll according to one aspect of the present invention includes two or more battery separators connected to each other along a lengthwise direction.

An apparatus according to one aspect of the present invention for producing a battery separator roll includes: a stock section for storing stock battery separators each having a length less than a prescribed length; a selecting section for selecting a combination of stock battery separators from combinations of stock battery separators among the stock battery separators stored, the combination of the stock battery separators, in a case where the stock battery separators in the combination are connected to each other along a lengthwise direction, having a length equal to or more than the prescribed length and closer to the prescribed length as compared to other combinations of stock battery separators among the combinations of stock battery separators, the other combinations of stock battery separators each having a length equal to or more than the prescribed length in a case where the stock battery separators in each of the other combinations are connected to each other; and a presentation section for presenting, to a user, the combination of the stock battery separators selected.

An apparatus according to one aspect of the present invention for producing a battery separator roll includes: a stock section for storing stock battery separators in association with lot information, the stock battery separators each having a length less than a prescribed length; a selecting section for selecting a combination of stock battery separators from combinations of stock battery separators among the stock battery separators stored, the combination of the stock battery separators, in a case where the stock battery separators in the combination are connected to each other along a lengthwise direction, having a length equal to or more than the prescribed length, the stock battery separators in the combination having been produced in production lots closer to each other as compared to stock battery separators in each of other combinations among the combinations of stock battery separators, the other combinations of stock battery separators each having a length equal to or more than the prescribed length in a case where the stock battery separators in each of the other combinations are connected to each other; and a presentation section for presenting, to a user, the combination of the stock battery separators selected.

Advantageous Effects of Invention

According to one aspect of the present invention, it is possible to provide a long battery separator roll.

BRIEF DESCRIPTION OF DRAWINGS

FIGS. 4A and 4B.

FIG. 11 is another flow chart showing the steps of selecting separators to be connected in an embodiment of the present invention.

DESCRIPTION OF EMBODIMENTS

[Common Configuration]

The following discusses in order a lithium-ion secondary battery, a separator, a heat-resistant separator, a method for producing the heat-resistant separator, a slitting apparatus, and a cutting device which are common to Embodiments discussed late.

(Lithium-Ion Secondary Battery)

A nonaqueous electrolyte secondary battery, typically, a lithium-ion secondary battery has a high energy density, and therefore, currently widely used not only as batteries for use in devices such as personal computers, mobile phones, and mobile information terminals, and for use in moving bodies such as automobiles and airplanes, but also as stationary batteries contributing to stable power supply.

Figure 1:
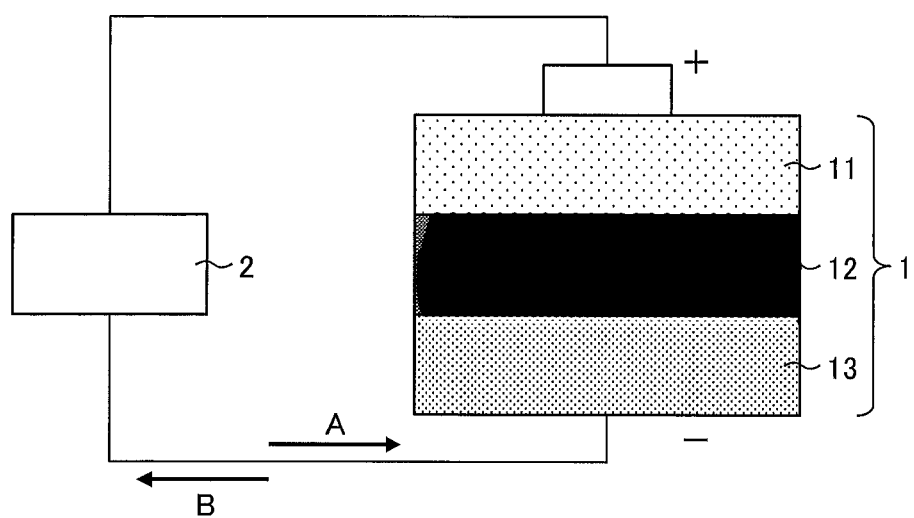
FIG. 1 is a schematic view illustrating a cross sectional configuration of a lithium-ion secondary battery.

FIG. 1 is a schematic view illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. Then, while the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between the cathode 11 which is a positive electrode of the lithium-ion secondary battery 1 and the anode 13 which is a negative electrode of the lithium-ion secondary battery 1. The separator 12 separates the cathode 11 and the anode 13, allowing lithium ions to move between the cathode 11 and the anode 13. The separator 12 contains, for example, polyolefin such as polyethylene or polypropylene as a material.

Figure 2A:
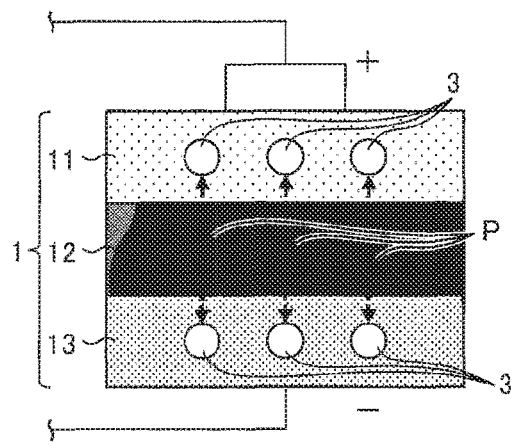
FIGS. 2A, 2B and 2C are schematic views illustrating details of the configuration of the lithium-ion secondary battery illustrated in FIG. 1.
Figure 2B:
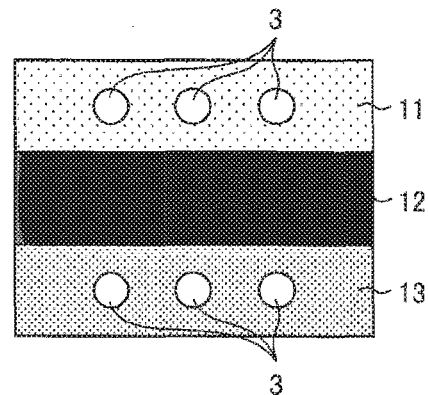
Figure 2C:
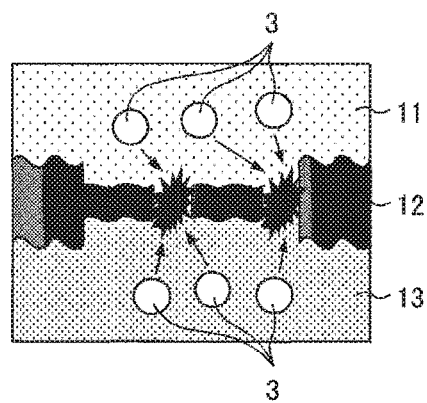

FIGS. 2A, 2B, and 2C are schematic views illustrating details of the configuration of the lithium-ion secondary battery 1 illustrated in FIG. 1. FIG. 2A illustrates a normal configuration. FIG. 2B illustrates a state in which a temperature of the lithium-ion secondary battery 1 has risen. FIG. 2C illustrates a state in which a temperature of the lithium-ion secondary battery 1 has sharply risen.

As illustrated in FIG. 2A, the separator 12 is provided with many pores P. Normally, lithium ions 3 in the lithium-ion secondary battery 1 can move back and forth through the pores P.

However, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens and the pores P are blocked as illustrated in FIG. 2B. As a result, the separator 12 shrinks. This stops the above back-and-forth movement of the lithium ions 3, and consequently stops the above temperature rise.

However, in a case where a temperature of the lithium-ion secondary battery 1 sharply rises, the separator 12 suddenly shrinks. In this case, as illustrated in FIG. 2C, the separator 12 may be destroyed. Then, the lithium ions 3 leak out from the separator 12 which has been destroyed. As a result, the lithium ions 3 do not stop moving back and forth. Consequently, the temperature continues rising.

(Heat-Resistant Separator)

Figure 3A:
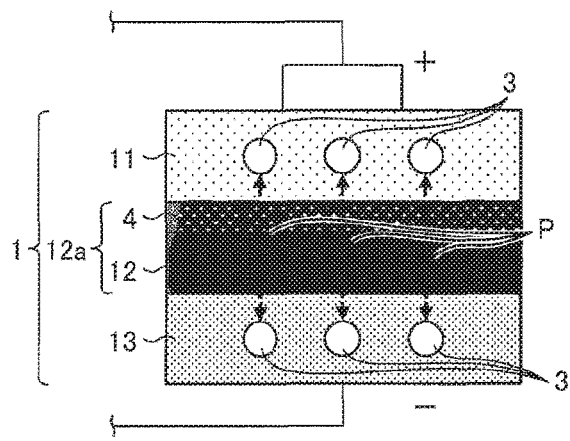
FIGS. 3A and 3B are schematic views illustrating another configuration of the lithium-ion secondary battery illustrated in FIG. 1.
Figure 3B:
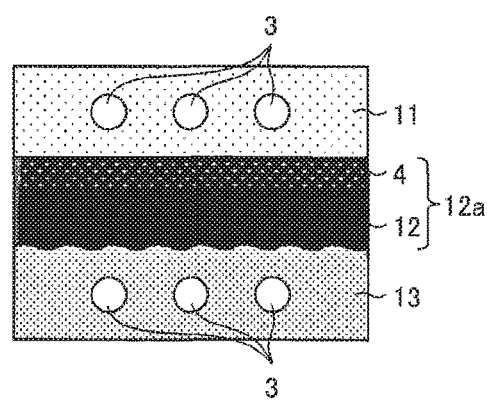

FIGS. 3A and 3B are schematic views illustrating another configuration of the lithium-ion secondary battery 1 illustrated in FIG. 1. FIG. 3A illustrates a normal configuration, and FIG. 3B illustrates a state in which a temperature of the lithium-ion secondary battery 1 has sharply risen.

As illustrated in FIG. 3A, the lithium-ion secondary battery 1 can further include a heat-resistant layer 4. The heat-resistant layer 4 and the separator 12 form a heat-resistant separator 12a. The heat-resistant layer 4 is laminated on a surface of the separator 12 which surface is on a cathode 11 side. Note that the heat-resistant layer 4 can alternatively be laminated on a surface of the separator 12 which surface is on an anode 13 side, or both surfaces of the separator 12. Further, the heat-resistant layer 4 is provided with pores which are similar to the pores P. Normally, the lithium ions 3 move back and forth through the pores P and the pores of the heat-resistant layer 4. The heat-resistant layer 4 contains, for example, wholly aromatic polyamide (aramid resin) as a material.

As illustrated in FIG. 3B, even in a case where the temperature of the lithium-ion secondary battery 1 sharply rises and as a result, the separator 12 melts or softens, the shape of the separator 12 is maintained because the heat-resistant layer 4 supports the separator 12. Therefore, such a sharp temperature rise results in only melting or softening of the separator 12 and consequent blocking of the pores P. This stops back-and-forth movement of the lithium ions 3 and consequently stops the above-described excessive discharging or excessive charging. In this way, the separator 12 can be prevented from being destroyed.

(Production Steps of the Heat-Resistant Separator)

How to produce the heat-resistant separator 12a of the lithium-ion secondary battery 1 is not specifically limited. The heat-resistant separator 12a can be produced by a well-known method. The following discussion assumes a case where the separator 12 contains polyethylene as a main material. However, even in a case where the separator 12 contains another material, the similar steps can still be applied to production of the separator 12.

For example, it is possible to employ a method including the steps of first forming a film by adding a plasticizer to a thermoplastic resin, and then removing the plasticizer with an appropriate solvent. For example, in a case where the separator 12 is made of a polyethylene resin containing ultrahigh molecular weight polyethylene, it is possible to produce the separator 12 by the following method.

This method includes (1) a kneading step of obtaining a polyethylene resin composition by kneading a ultrahigh molecular weight polyethylene and an inorganic filler such as calcium carbonate, (2) a rolling step of forming a film with the polyethylene resin composition, (3) a removal step of removing the inorganic filler from the film obtained in the step (2), and (4) a stretching step of obtaining the separator 12 by stretching the film obtained in the step (3).

In the removal step, many fine pores are provided in the film. The fine pores of the film stretched in the stretching step become the above-described pores P. The separator 12 formed as a result is a polyethylene microporous film having a prescribed thickness and a prescribed air permeability.

Note that in the kneading step, 100 parts by weight of the ultrahigh molecular weight polyethylene, 5 parts by weight to 200 parts by weight of a low-molecular weight polyolefin having a weight-average molecular weight of 10000 or less, and 100 parts by weight to 400 parts by weight of the inorganic filler can be kneaded.

Thereafter, in a coating step, the heat-resistant layer 4 is formed on a surface of the separator 12. For example, on the separator 12, an aramid/NMP (N-methylpyrrolidone) solution (coating solution) is applied, and thereby, the heat-resistant layer 4 that is an aramid heat-resistant layer is formed. The heat-resistant layer 4 can be provided on only one surface or both surfaces of the separator 12. Alternatively, the heat-resistant layer 4 can be formed by using alumina/carboxymethyl cellulose for coating.

A method for coating the separator 12 with a coating solution is not specifically limited as long as uniform wet coating can be performed by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting a thickness of a coating wet film, a solid-content concentration which is the sum of concentrations of a binder and a filler in the coating solution, and a ratio of the filler to the binder.

It is possible to use a resin film, a metal belt, a drum or the like as a support with which the separator 12 is fixed or transferred in coating.

As described above, it is possible to produce the heat-resistant separator 12a in which the heat-resistant layer 4 is laminated on the separator 12. Thus produced heat-resistant separator 12a is wound on a cylindrical core. Note that a subject to be produced by the above production method is not limited to the heat-resistant separator 12a. The above production method does not necessarily include the coating step. In a case where the method includes no coating step, the subject to be produced is the separator 12.

(Slitting Apparatus)

The heat-resistant separator 12a or the separator 12 (hereinafter, referred to as "separator") preferably has a width (hereinafter, referred to as "product width") suitable for application products such as the lithium-ion secondary battery 1. However, for improving productivity, the separator is produced so as to have a width that is equal to or larger than a product width. Then, after having been once produced so as to have a width equal to or larger than the product width, the separator is slit into a separator(s) having the product width. Note that the "separator width" means a dimension of the separator in a direction parallel to a plane in which the separator extends and perpendicular to a lengthwise direction of the separator. In the description below, a wide separator having not yet been slit is referred to as an "original sheet" while particularly a separator having been slit is referred to as a "slit separator".

Figure 4A:
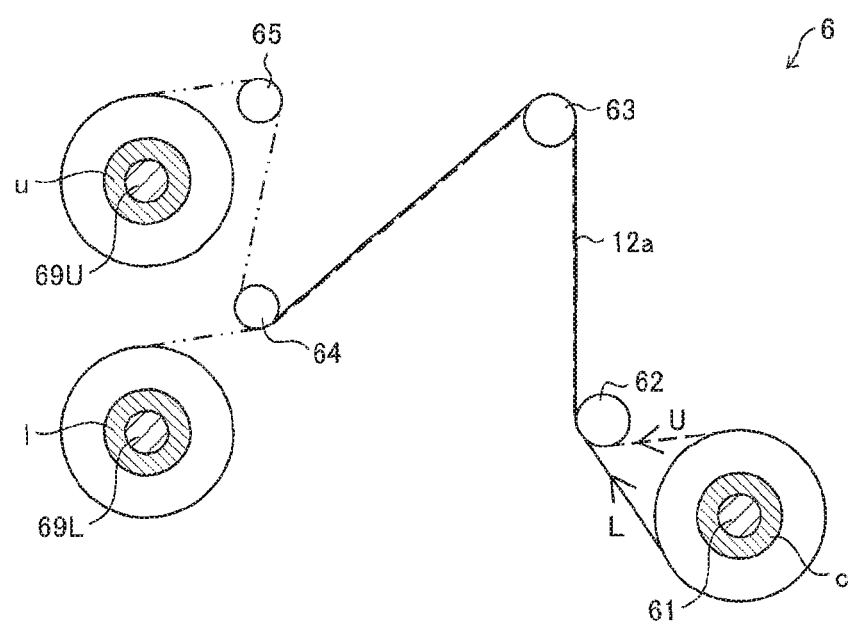
FIGS. 4A and 4B are schematic views illustrating a configuration of a slitting apparatus for slitting a separator.
Figure 4B:
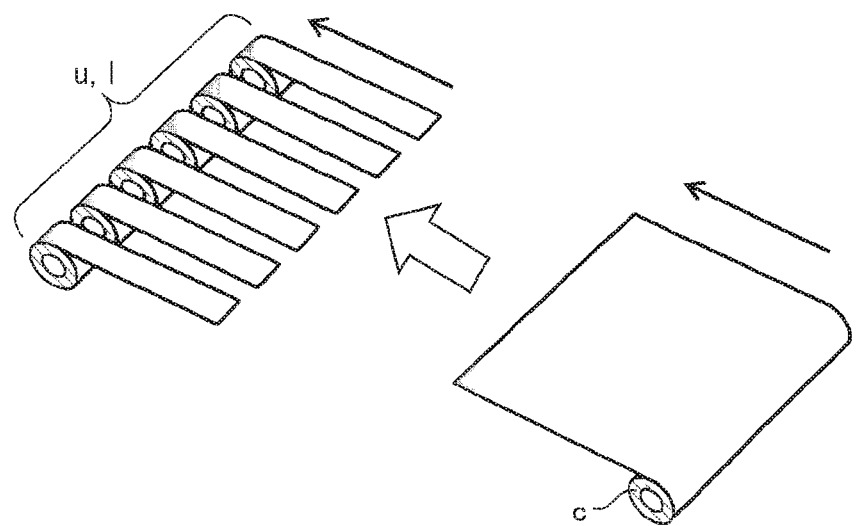

FIGS. 4A and 4B are schematic views illustrating a configuration of a slitting apparatus 6 for slitting the separator. FIG. 4A illustrates an entire configuration, and FIG. 4B illustrates an arrangement before and after slitting the original sheet.

As illustrated in FIG. 4A, the slitting apparatus 6 includes a rotatably-supported cylindrical wind-off roller 61, rollers 62 to 65, and take-up rollers 69U and 69L. The slitting apparatus 6 is further provided with the cutting device 7 described later.

(Before Slitting)

In the slitting apparatus 6, a cylindrical core c on which the original sheet is wrapped is fit on the wind-off roller 61. As illustrated in FIG. 4B, the original sheet is wound off from the core c to a route U or L. Thus unwound original sheet is conveyed to the roller 64 via the roller 63. In the step of conveying the unwound original sheet, the original sheet is slit into slit separators.

(After Slitting)

As illustrated in FIG. 4B, some of the slit separators are wound on cores u fit on take-up rollers 69U, respectively. Meanwhile, the others of the slit separators are wound on cores l fit on take-up rollers 69L, respectively. Note that each of the slit separators wound into a roll form is referred to as a "separator roll".

(Cutting Device)

Figure 5A:
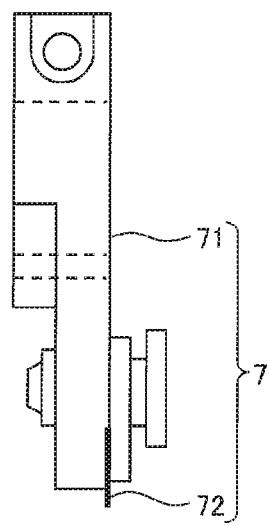
FIGS. 5A and 5B are side views and a front view of a cutting device of the slitting apparatus illustrated in FIG. 4.
Figure 5B:
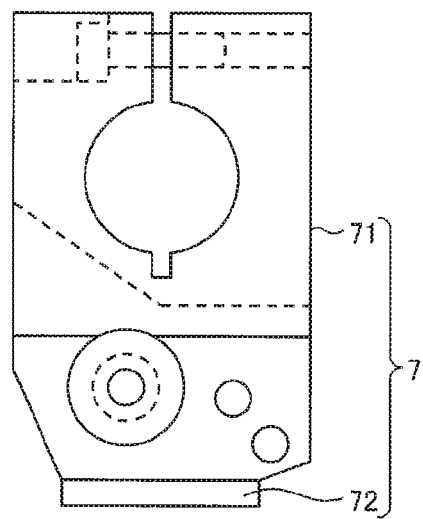

FIG. 5 is a view FIGS. 5A and 5B are views illustrating a configuration of the cutting device 7 of the slitting apparatus 6 as illustrated in FIG. 4A. FIG. 5A is a side view of the cutting device 7, and FIG. 5B is a front view of the cutting device 7.

As illustrated in FIGS. 5A and 5B, the cutting device 7 includes a holder 71 and a blade 72. The holder 71 is fixed to a housing or the like provided in the slitting apparatus 6. The holder 71 holds the blade 72 in a manner such that the blade 72 and the original sheet of the separator being conveyed have a fixed positional relation. The blade 72 has a finely sharpened edge and slits the original sheet of the separator by using this edge.

Embodiment 1

In the following description, a single-layer separator and a heat-resistant separator 12a are not distinguished from each other but both are referred to as a "separator". Embodiment 1 is applicable not only to a single-layer separator having no heat-resistant layer but also to a heat-resistant separator having a heat-resistant layer. In the step of producing an original sheet of the separator, the separator is suspended on a roller and pulled. Moreover, the separator is a film having stretched pores. Therefore, in some cases, the separator is broken. Accordingly, even in a case where a separator having a prescribed length (e.g., 1500 m in a lengthwise direction (flow direction, MD: Machine direction)) is to be produced, separators having various lengths shorter than the prescribed length may be produced. In production of secondary batteries, the separator and a sheet electrode are wound together. At this time, in a case where a separator roll and an electrode roll have different lengths in the lengthwise direction, respectively, part of one of the separator roll and the electrode roll is wasted. Alternatively, in the above case, it becomes necessary to replace the one of the separator roll and the electrode roll in accordance with the lengths. Therefore, produced separator rolls preferably have an identical prescribed length, that is, a constant length in the lengthwise direction.

In view of the above, in Embodiment 1, a separator roll having the prescribed length is produced by connecting, along the lengthwise direction, separators which are produced in production steps and have different lengths, respectively. Here, separator original sheets are connected to each other (connecting step) after a stretching step and a coating step and before a slitting step. However, the present invention is not limited to this configuration but it is also possible to connect slit separators after the slitting step.

(Connecting Step)

Figure 6A:
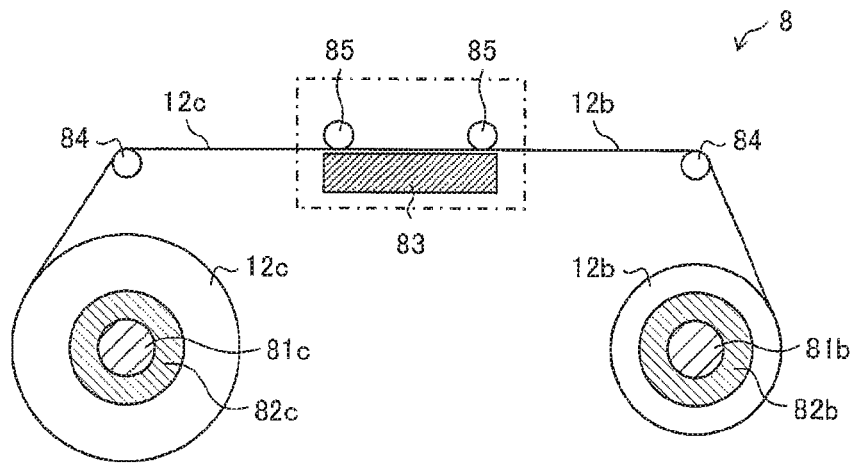
FIGS. 6A, 6B, and 6C are cross sectional views illustrating an outline configuration of a connecting apparatus according to one embodiment of the present invention.
Figure 6B:
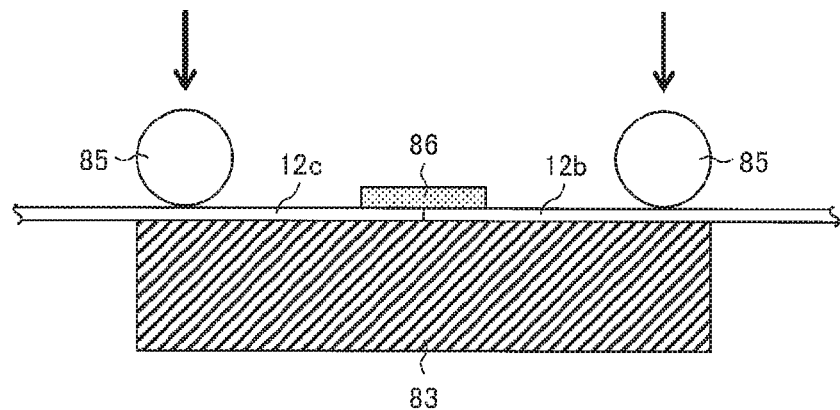
Figure 6C:
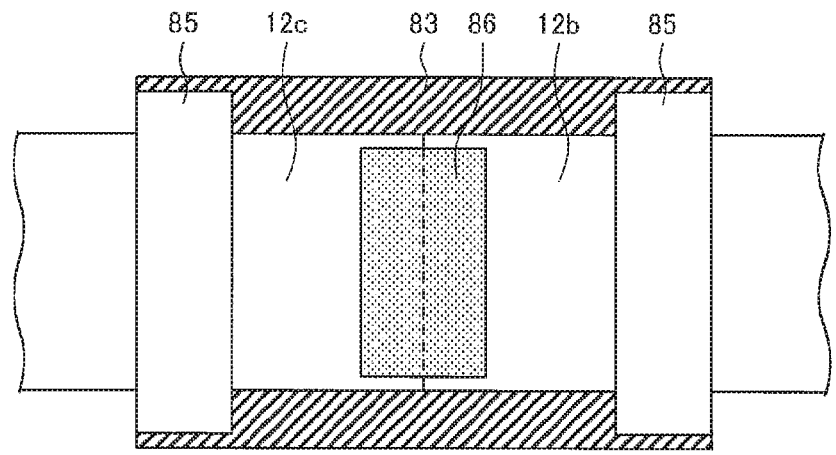

FIGS. 6A, 6B, and 6C are cross sectional views illustrating an outline configuration of a connecting apparatus for connecting separators (battery separators). FIG. 6B is an enlarged view of a portion boxed by dashed line in FIG. 6A. FIG. 6C is a top view illustrating the portion corresponding to FIG. 6B. The connecting apparatus 8 includes a first roller 81b, a second roller 81c, rollers 84 and 85 and a connecting table 83. On the first roller 81b, a roll of a separator 12b is set. The separator 12b is one of two separators to be connected. On the second roller 81c, a roll of a separator 12c which is the other one of the two separators is set. The separator 12b is wrapped around a cylindrical core 82b and the cylindrical core 82b is detachably held by the first roller 81b. Meanwhile, the separator 12c is wrapped around a cylindrical core 82c and the cylindrical core 82c is detachably held by the second roller 81c. For example, the first roller 81b and the second roller 81c changes respective outer diameters, so that the first roller 81b and the second roller 81c each accordingly hold or release the core 82b or 82c. The separators 12b and 12c each have a length less than a prescribed value (specification of products) in the lengthwise direction. Note that though the separators 12b and 12c have lengths different from each other in the lengthwise direction in the above case, it is possible to connect separators having lengths substantially equal to each other, respectively.

The separator 12b has an end pulled from a roll of the separator 12b while the separator 12c has an end pulled from a roll of the separator 12c. Then, the ends of the separators 12b and 12c are positioned on the connecting table 83 via the rollers 84. The separators 12b and 12c each are fixed by the rollers 85 on the connecting table 83. At this time, the ends of the separators 12b and 12c abut against each other. The rollers 85 press the separators 12b and 12c to the connecting table 83, thereby fixing respective positions of the separators 12b and 12c. It is possible to provide any pressing member having a pressing plane, in place of the rollers 85. The rollers 85 can rotate and thereby assist introduction of the separators 12b and 12c onto the connecting table 83. Note that the separators 12b and 12c are arranged in a manner such that an outer surface of the roll of the separator 12b is provided on the same side as that of the separator 12c. This is intended to connect the two separators 12b and 12c in a manner such that the heat-resistant layer 4 in a side surface of the separator 12b is provided on the same side as that of the separator 12c. Even in a case where the heat-resistant layer 4 is formed on both surfaces of each of the separators 12b and 12c, it is preferable to connect side surfaces of the separators 12b and 12c to each other which side surfaces are the same in terms of separator production, in consideration of the possibility of the occurrence of difference in quality between the both surfaces of each of the separators 12b and 12c.

In a state where the ends of the separators 12b and 12c abut against each other, the separators 12b and 12c are connected to each other with an adhesive tape 86. Here, a width of the adhesive tape 86 in a transverse direction (TD) is smaller than respective widths of the separators 12b and 12c. However, the width of the adhesive tape 86 can alternatively be equal to the widths of the separators 12b and 12c. Subsequently, in the slitting step, widthwise ends (ends in the transverse direction) of each of thus connected separators are cut off, so that the width of the adhesive tape and the widths of the separators can be precisely equal to each other. Note that approximately a half of a bonding area of the adhesive tape 86 is adhered to the separator 12b which is one of the two separators to be connected, while the other half of the bonding area of the adhesive tape 86 is adhered to the separator 12c which is the other one of the separators. The transverse direction in the present specification means a direction parallel to a plane in which the separator extends and substantially perpendicular to the lengthwise direction of the separator.

Thus connected separators 12b and 12c are wound on one of the cores 82b and 82c by use of the rollers 81b and 81c so as to form one separator roll. This makes it possible to obtain a separator roll having a prescribed length in the lengthwise direction, by connecting separators along the lengthwise direction. Though the separator roll obtained by connecting the separators has a portion where the adhesive tape 86 is adhered, this portion cannot be used as a battery separator. However, in battery production steps, the portion where the adhesive tape is adhered can be cut off after a sheet electrode and a separator of the separator roll are overlapped, so that the separator of the separator roll except the portion can be used. Even though time and effort for cutting off the portion is additionally required, it will be easy to overlap, for example, 1000 m or more of an electrode and such a separator if the electrode and the separator have the same length in the lengthwise direction.

Note that the separators 12b and 12c can be cut in advance so that a resultant separator obtained by connecting the separators 12b and 12c may have a prescribed length in the lengthwise direction. Alternatively, after the separators 12b and 12c are connected, a length of a resultant separator in the lengthwise direction can be adjusted by cutting a surplus portion of the resultant separator.

Figure 7:
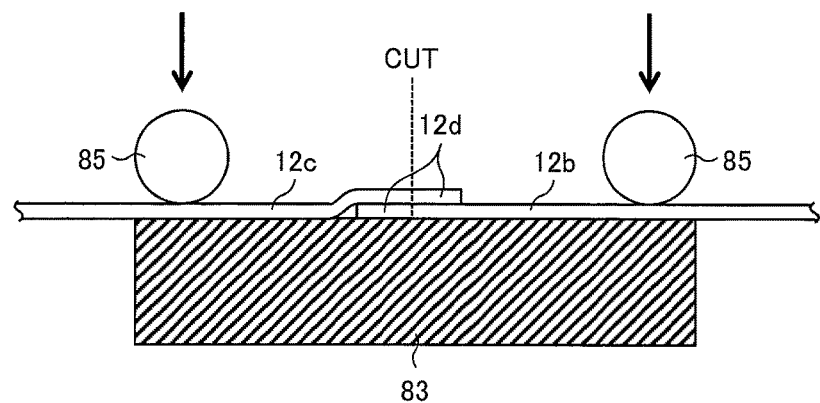
FIG. 7 is a cross sectional view illustrating a method of cutting a separator in the connecting apparatus.

Further, as illustrated in FIG. 7, it is possible to cut, at a position where the separators 12b and 12c overlap each other, the separators 12b and 12c whose end portions are overlapped with each other and fixed on the connecting table 83. When thus cut end portions 12d of the separators 12b and 12c are removed, the end of the separator 12b coincides with the end of the separator 12c. In this state, the adhesive tape 86 is put on the separators 12b and 12c. Then, the separators 12b and 12c can be connected to each other with no gap. Reduction of a gap between the separators 12b and 12c makes it possible to prevent an adhesive of the adhesive tape 86 from sticking to any other portion of the separators 12b and 12c, a roller of a production apparatus, and the like.

(Slitting Step)

After the connecting step, a separator original sheet obtained by connecting separators is slit into slit separators each having a prescribed width. For example, a separator original sheet of 1800 mm in width is slit into slit separators of 100 mm in width. In this case, 17 slit separators of 100 mm in width are produced from one separator original sheet.

The remaining 100 mm of the separator original sheet is a cut-off widthwise end portions on both sides of the separator original sheet. The width of each of the slit separators corresponds to a separator width suitable for production of application products such as batteries. The slit separators are wound into a roll while being connected to each other with the adhesive tape 86 and thereby keeping a prescribed length (e.g., 1500 mm). The width of the adhesive tape 86 on each of the slit separators is equal to a width of the slit separator.

The connecting step can be performed after the slitting step. However, in this case, a side surface of the separator roll, which side surface is made of a widthwise end surface of the slit separator, may become uneven due to an error in alignment in the TD in connecting the separators. On the contrary, in a case where the slitting step is performed after the connecting step, positions of the separators connected to each other can be highly precisely aligned in the TD by slitting. Further, the lengthwise directions of the separators connected to each other can be arranged to be parallel to one another.

(Adhesive Tape)

The separator (the original sheet or the slit separator) is suspended on rollers and the like and conveyed in each production step (for example, slitting step or battery production step) and conveyed. Accordingly, a pull force is applied to the separator in the lengthwise direction (MD). The upper limit of the pull force applied to the separator in the production step is, at the highest, smaller than a force (tensile strength or yield strength) at which the separator breaks or yields (plastic-deformed). Further, an adhesive force of the adhesive tape 86 or strength of the adhesive tape 86 itself is required to be sufficient to tolerate the pull force applied to the separator in the production step. This is because production apparatuses may be designed in consideration of only the strength of the separator but not the strength of the adhesive tape 86.

Accordingly, preferably, the adhesive tape 86 has a tensile strength or an yield strength in MD greater than a tensile strength or a yield strength of the separator in MD so that the adhesive tape 86 itself should not be broken. A material constituting a base material of the adhesive tape 86 can be, for example, resin (polyethylene, polypropylene, etc.). In a case where the material constituting the base material of the adhesive tape 86 is identical to a material contained in the separator, it is preferable that the adhesive tape 86 has a thickness that is equal to or greater than a thickness (e.g., 30 µm) of the separator.

Meanwhile, an excessively large thickness of the adhesive tape 86 may cause another problem. The slit separator is wound and thereby formed into a roll. Accordingly, the adhesive tape 86 is also wound. The thickness of the adhesive tape 86 produces a raised portion. Accordingly, the thickness of the adhesive tape 86 is preferably small to a certain degree so that no mark of the raised portion may remain on a portion of the slit separator which portion is on an inner side or an outer side of the adhesive tape 86 in the roll. For example, the thickness of the adhesive tape 86 is preferably 140 µm or less and more preferably 90 µm or less.

Moreover, the adhesive force of the adhesive tape 86 is preferably greater than a pull force at which the separator breaks or yields in MD so that the adhesive tape 86 may not peel off. The adhesive tape 86 can contain, for example, an acrylic adhesive as an adhesive. The adhesive force can be increased by increasing a bonding area, that is, by increasing a length in MD of the adhesive tape 86 adhered to each separator.

However, an excessively large length of the adhesive tape 86 in the lengthwise direction is not preferable in view of the raised portion produced by the thickness of the adhesive tape 86. For example, the adhesive tape 86 can be arranged to contain an acrylic adhesive, and the length of the adhesive tape 86 adhered to one of separators connected can be arranged to be 25 mm or less. In a case where the width of the slit separator is arranged to be 100 mm, the adhesive tape 86 can have a dimension of 50 mm in length×100 mm in width. The bonding area of the adhesive tape 86 with one of the separators is a half area, that is, 25 mm×100 mm of the above dimension.

Further, the adhesive tape 86 can have a color and this color can be different from a color of the separator. This makes a position where the adhesive tape 86 is adhered easily visible. Consequently, it becomes easy to specify a portion to be cut off, for example, in the battery production step.

Note that another connecting method can be alternatively used. For example, two separators can be connected by overlapping respective portions of the two separators and bonding thus overlapped portions with an adhesive or the like. Alternatively, for example, two separators can be connected by overlapping respective portions of the two separators and welding thus overlapped portions of the two separators. The welding can be carried out with heat, ultrasonic waves, or the like. Note that in a case where the separators include the heat-resistant layer, it is preferable to connect the separators by bonding with an adhesive tape or an adhesive rather than by welding. Further, it is also possible to connect obliquely cut end portions of two separators.

(Selection of Separators to be Connected)

In a case where separators (original sheets or slit separators) each having a length less than a prescribed length are accidentally produced due to breakage in the production steps, such separators can be connected in the order of production of the separators. However, the lengths of such separators produced due to breakage vary a great deal. In a case where relatively long separators are connected, a length of thus connected separators may exceed the prescribed length. This may cause a separator waste. On the other hand, in a case where relatively short separators are connected, a length of thus connected separators may not reach the prescribed length. This case requires connection of an additional separator.

If some separators each having a length less than the prescribed length are stored as stocks prior to the connecting step, it will be possible to select separators having an appropriate combination of lengths and thereby efficiently produce a separator having the prescribed length.

Separator original sheets each having an MD length less than the prescribed length due to breakage in a production step (e.g., coating step) prior to the slitting step are stored as stocks in a stock apparatus 9.

Figure 8:
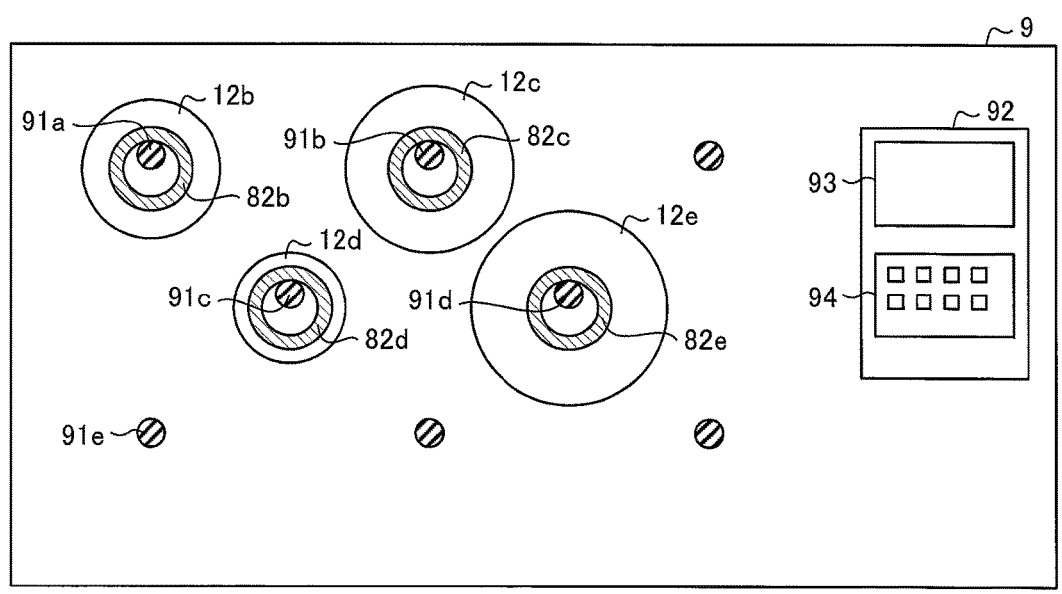
FIG. 8 is a front view illustrating an outline configuration of a stock apparatus.

FIG. 8 is a front view illustrating an outline configuration of the stock apparatus 9. The stock apparatus 9 (production apparatus) includes support bars 91a to 91e (stock section), and a control device 92 (stock section). The control device 92 includes a display panel 93 and an operation panel 94. The display panel 93 is a display device such as a liquid crystal display device. The operation panel 94 is an input device having a plurality of keys for allowing user input. The display panel 93 and the operation panel 94 can be integrated into a touch panel.

The support bars 91a through 91e are bars sticking out in a direction from a surface of a drawing sheet toward a front side of the drawing sheet. The support bars 91a to 91e are arranged to run through cores 82b to 82e of separator rolls 12b to 12e, so that the separator rolls 12b to 12e can be hung from a front side to a back side of the stock apparatus 9. Then, rolls of separator original sheets each having a length less than the prescribed length are stored as stocks on the support bars 91a to 91e. The separator rolls can be placed (stored as stocks) manually by a user (operator).

The stock apparatus 9 can include a measuring section (not illustrated) for measuring respective lengths of the separator rolls 12b to 12e stored as stocks. For example, the measuring section can calculate an MD length of each separator by measuring a diameter of each separator roll. The measuring section stores information set in advance on core diameters and one-sheet thicknesses of separators, for the purpose of calculating an MD length of a separator. Alternatively, the measuring section can specify an MD length, with reference to a table set in advance for converting a diameter of a separator roll to the MD length. As a further alternative, the measuring section can measure a weight of a separator roll hung on any of the support bars 91a to 91e and specify an MD length of the separator roll on the basis of the weight. In this case, in the measuring section, information on a mass of each core and a mass per length of a separator or a table for converting a weight of the separator roll to the MD length is set. In this way, the measuring section can include an optical measuring device or a weight scale.

The separator rolls 12b to 12e each are stored as stocks in association with information on an MD length of each of the separator rolls 12a to 12e. Note that, for example, a user can measure an MD length of the separator roll 12b and input, into the control device 92, thus measured MD length as an MD length of the separator roll 12b stored as a stock on the support bar 91a. The support bars 91a to 91e each are given the number or the like for identification.

Figure 9:
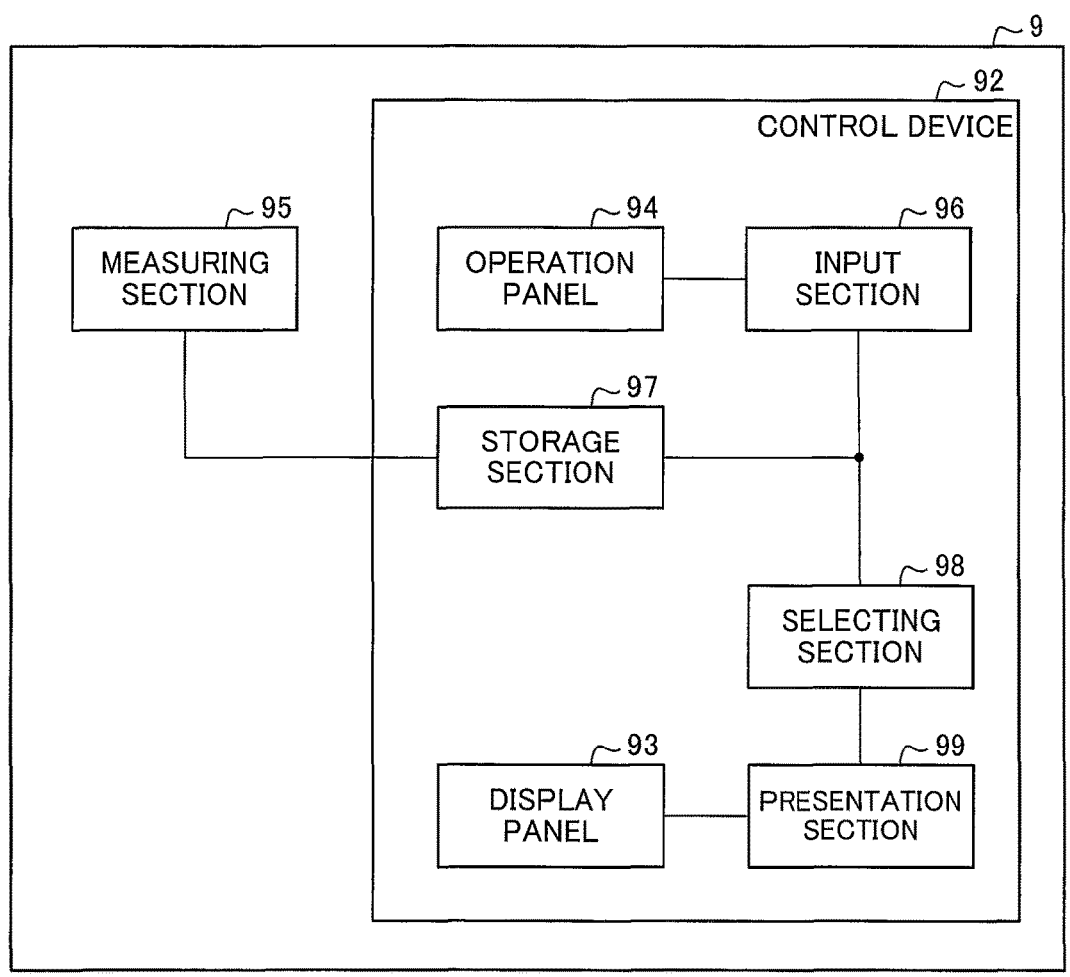
FIG. 9 is a diagram illustrating functional blocks of the stock apparatus.

FIG. 9 is a diagram illustrating functional blocks of the stock apparatus 9. The control device 92 includes an input section 96, a storage section 97, a selecting section 98, and a presentation section 99 as well as the display panel 93 and the operation panel 94. The measuring section 95 provided in the stock apparatus 9 writes, in the storage section 97, lengths of respective separator rolls stored as stocks in association with the corresponding numbers respectively given to the support bars.

The input section 96 receives an instruction input that is made by a user via the operation panel 94. Instead of the measuring section 95, the user can measure a length of each separator roll stored as a stock and input, via the operation panel 94, thus measured value in association with the number given to a corresponding support bar. The input section 96 writes, into the storage section 97, the length of the separator roll stored as a stock in association with the number given to the corresponding support bar. Further, in a case where an instruction input for selecting separators to be connected is received from the user, the input section 96 transmits the instruction input to the selecting section 98. Further, the user can input lot information of separator rolls stored as stocks, via the operation panel 94.

The storage section 97 stores the lengths of the separator rolls stored as stocks, in association with the corresponding numbers respectively given to the support bars. Further, the lot information of the separator rolls stored as stocks can be stored in association with the corresponding numbers respectively given to the support bars. The storage section 97 can be, for example, a RAM (Random Access Memory), a tape, a disc, a card, a semiconductor memory, or a storage device such as a programmable logic device.

The selecting section 98 selects a combination of separators to be connected from among the separators stored as stocks, in accordance with an instruction input to select the separators to be connected. The selecting section 98 outputs the combination of thus selected separators to the presentation section 99.

The presentation section 99 controls display of the display panel 93. The presentation section 99 causes the display panel 93 to display a combination of selected separators. For example, the presentation section 99 presents, to a user, the numbers of support bars on which the selected separators are stored as stocks. Note that the presentation section 99 can indicate with sound the combination of the selected separator by use of a speaker or the like.

Control blocks (particularly, the input section 96, the selecting section 98, and the presentation section 99) of the control device 92 can be realized by a logic circuit (hardware) provided in an integrated circuit (IC chip) or the like or can be alternatively realized by software as executed by a CPU (Central Processing Unit).

In the latter case, the control device 92 includes: a CPU that executes instructions of a program that is software realizing the foregoing functions; ROM (Read Only Memory) or a storage device (each referred to as "storage medium") storing the program and various kinds of data in such a form that they are readable by a computer (or a CPU); and RAM (Random Access Memory) that develops the program in executable form. The object of the present invention can be achieved by a computer (or a CPU) reading and executing the program stored in the storage medium. The storage medium may be "a non-transitory tangible medium" such as a tape, a disk, a card, a semiconductor memory, and a programmable logic circuit. Further, the program may be made available to the computer via any transmission medium (such as a communication network and a broadcast wave) which enables transmission of the program.

Figure 13A:
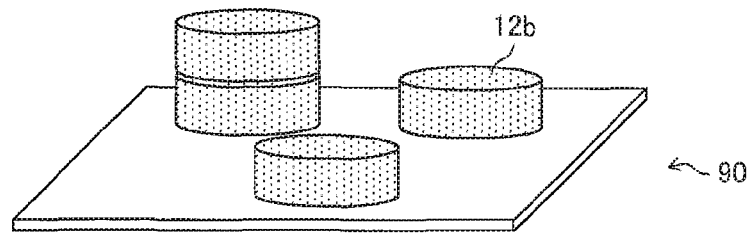
FIGS. 13A, 13B, 13C and 13D are views illustrating a modified example of a stock section.
Figure 13B:
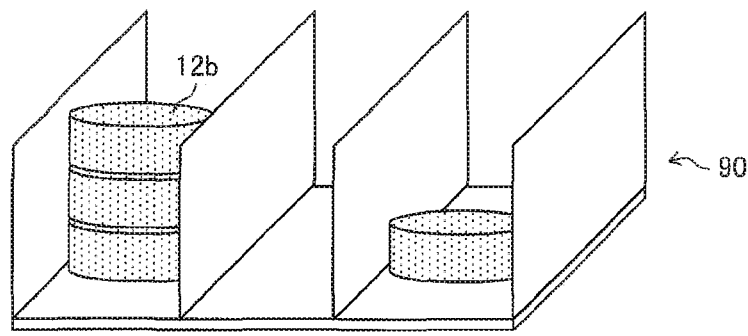
Figure 13C:
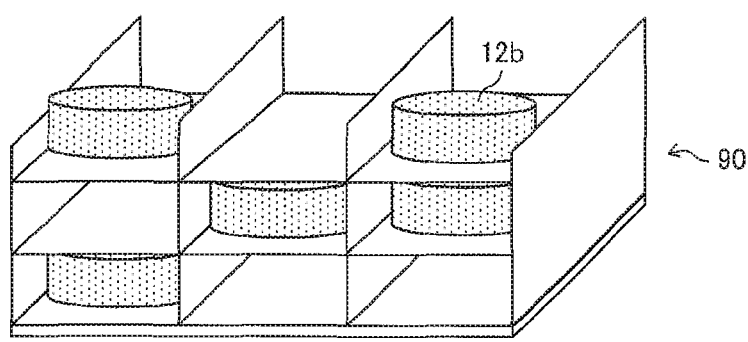
Figure 13D:
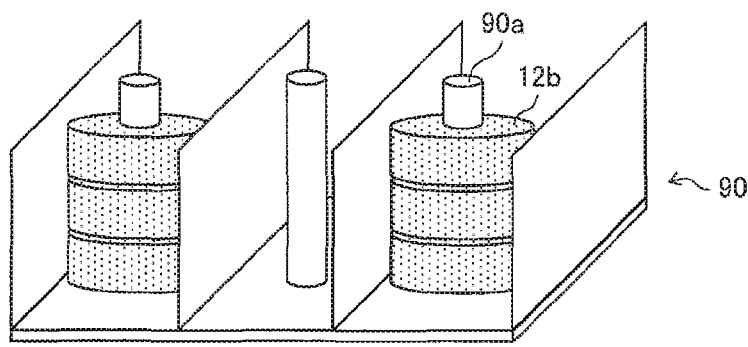
Figure 14A:
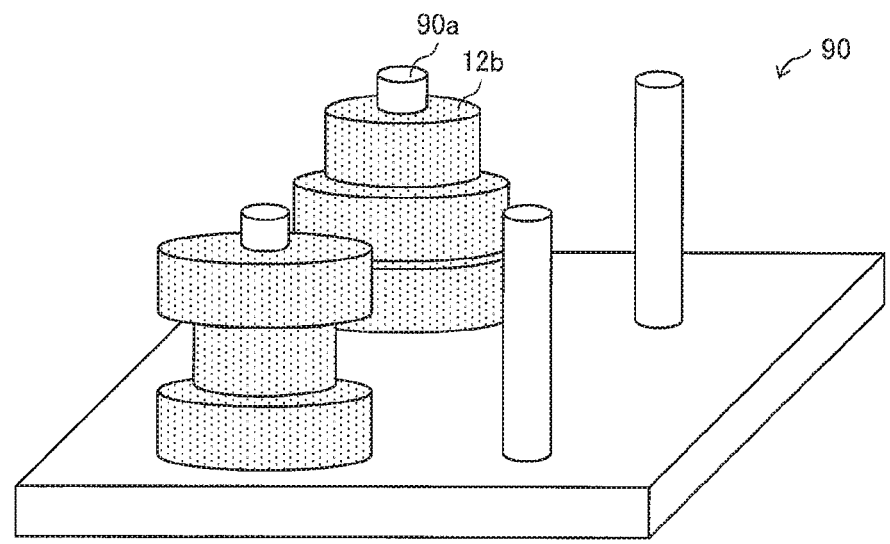
FIGS. 14A, 14B and 14C are views illustrating a modified example of a stock section.
Figure 14B:
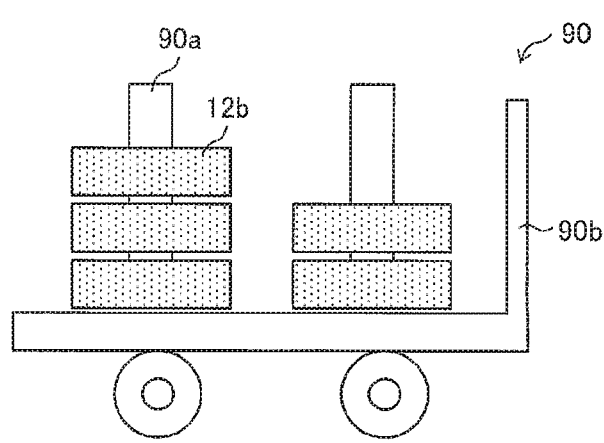
Figure 14C:
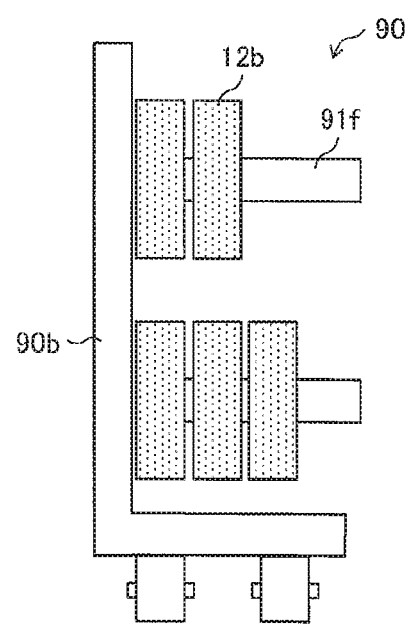
Figure 15A:
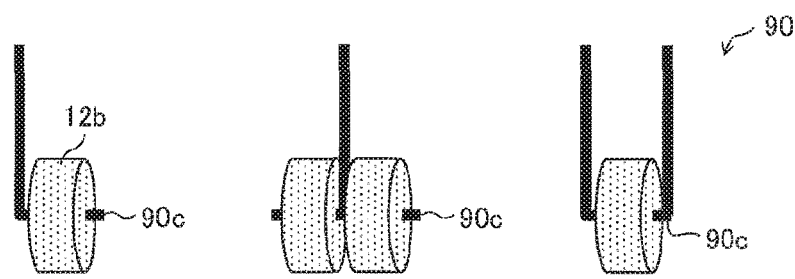
FIGS. 15A and 15B are views illustrating a modified example of a stock section.
Figure 15B:
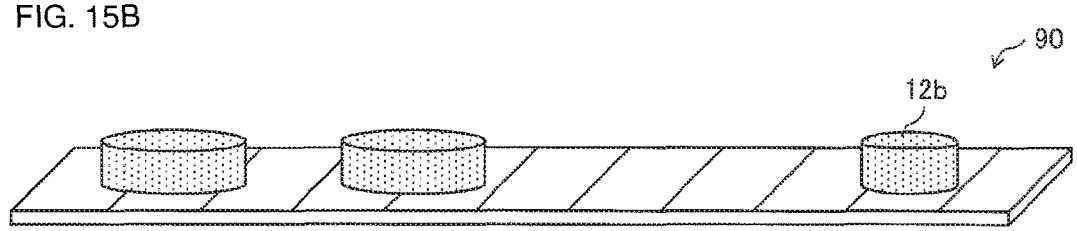

Note that the stock section for storing separator rolls as stocks is not limited to the form of the support bars as illustrated in FIG. 8, but can be a prescribed space in which separator rolls can be stored. FIGS. 13A, 13B, 13C, 13D, 14A, 14B, 14C, 15A and 15B are views each illustrating a modified example of the stock section. As illustrated in FIG. 13A, the stock section 90 can be a space in which separator rolls 12b can be put. As illustrated in FIG. 13B, the stock section 90 can be a space partitioned with walls into compartments in each which one or more of the separator rolls 12b can be placed. Alternatively, as illustrated in FIG. 13C, the stock section 90 can be a shelf vertically and horizontally partitioned into compartments in which the separator rolls 12b can be placed, respectively. As a further alternative, as illustrated in FIG. 13D, the stock section 90 can be arranged such that each compartment in a space is provided with a bar 90a which is to be inserted into a core of each of the separator rolls 12b placed in the compartment. The bar 90a is provided along a vertical direction. As illustrated in FIG. 14A, the stock section 90 can be arranged to include bars 90a each of which is to be inserted into cores of separator rolls 12b. As illustrated in FIG. 14B, the stock section 90 can include a wagon 90b that can be moved by a user. The wagon 90b is provided with bars 12a along a vertical direction so that the separator rolls 12b can be placed at a prescribed position in the wagon 90b. As illustrated in FIG. 14C, the wagon 90b can include support bars 91f provided along a horizontal direction. The support bars 91f are fixed to a side wall provided to the wagon 90*b*. As illustrated in FIG. 15A, the stock section 90 can be provided with hooks 90*c* which hang from above. The hooks 90*c* are hung with chains, pipes or the like, from a beam, a ceiling or the like. As illustrated in FIG. 15B, the stock section 90 can be a belt conveyer. In this case, the separator rolls 12*b* can be carried by the belt conveyer, in the order of production lots. In the above cases, for example, a user may input, into the control device 92, an MD length of each separator roll 12*b* stored as a stock at a prescribed position. The user also can input, into the control device 92, lot information of each separator roll stored as a stock.

(Selection Flow 1)

Figure 10:
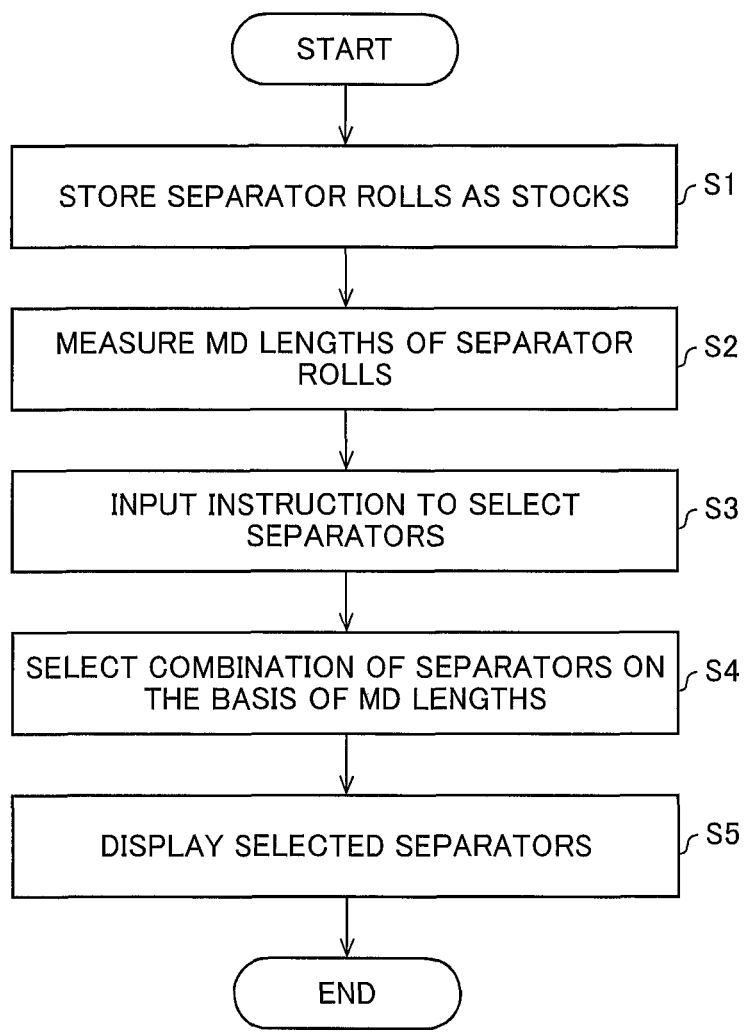
FIG. 10 is a flow chart showing the steps of selecting separators to be connected in an embodiment of the present invention.

FIG. 10 is a flow chart showing the steps of selecting separators to be connected. First, a user places separator rolls each having an MD length less than a prescribed length, on free support bars 91*a* through 91*e* in the stock apparatus 9 (S1).

The user or the measuring section 95 measures the MD length of each separator roll stored as a stock (S2). The user or the measuring section 95 inputs, into the control device 92, the MD length of the separator roll stored as a stock in association with the number indicative of the separator roll (the number given to a support bar on which the separator roll is stored as a stock). The storage section 97 of the control device 92 stores the MD length of the separator roll stored as a stock in association with the number indicative of the separator roll.

At a desired time point, the user inputs, into the control device 92, an instruction to select (display) separators to be used in connecting separators (S3). The selecting section 98 of the control device 92 selects a combination of separators from among separators stored as stocks so that a separator obtained by connecting the separators in thus selected combination along the lengthwise direction will have a length which is equal to or longer than the prescribed length and also closer to the prescribed length. For example, from among combinations of two separators which have a length equal to or more than the prescribed length when connected, a combination of separators having a length closest to the prescribed length as a result of connection of the separators in the combination is selected. In this way, the selecting section 98 selects a combination of separators on the basis of MD lengths of the separators (S4). Such selection can make the number of joint(s) between separators to the minimum (1 joint) and also to reduce an amount of wasted separator of a length beyond the prescribed length.

For example, a case where four separator rolls having MD lengths of 480 m, 500 m, 600 m, and 700 m, respectively, are stored as stocks is assumed. Then, if the prescribed MD length is 1000 m, a combination of separator rolls having lengths of 480 m and 600 m is selected. This combination of separators has a length of 1000 m or more when the separators are connected, and also minimizes an amount of wasted separator. Note that in a case where it is expected that a length of no combination of two separators connected will reach the prescribed MD length, the selecting section 98 can select a combination of three separators.

The presentation section 99 causes the display panel 93 to display the numbers indicative of thus selected separators and a total MD length of the separators (S5). The user takes out thus presented combination of separators from the stock apparatus 9 and connects the separators by use of the above-described connecting apparatus. The user inputs, into the control device 92 via the operation panel 94, from which support bars the separators are taken out. Further, the measuring section 95 can be arranged to detect that the separator rolls are taken out from the support bars and notify, to the control device 92, that the separators has been taken out. The storage section 97 erases information on the separators taken out.

(Selection Flow 2)

In the selection flow 1 above, a combination of separators to be connected is selected on the basis of MD lengths of separators stored as stocks. However, for example, it is also possible to select a combination of separators to be connected on the basis of MD lengths and lots.

FIG. 11 is another flow chart showing the steps of selecting separators to be connected. Steps identical to the steps in the flow of FIG. 10 are given identical numbers, respectively, and explanations thereof are omitted. First, a user places separator rolls each having an MD length less than a prescribed length, on free support bars 91*a* through 91*e* in the stock apparatus 9 (S1).

The user or the measuring section 95 measures the MD length of each separator roll stored as a stock (S2). The user or the measuring section 95 inputs, into the control device 92, the MD length of the separator roll stored as a stock in association with the number indicative of the separator roll (the number given to a support bar on which the separator roll is stored as a stock). At this time, the user inputs, into the control device 92, lot information of the separator roll together with the number. The storage section 97 of the control device 92 stores (manages) the MD length of the separator roll stored as a stock, the number indicative of the separator roll, and the lot information inputted above in association with one another (S11).

The lot information is information on the lot number, a lot code, or the like indicative of a production lot. The lot number is given to the separator original sheet in the order of production. For example, the lot number can be the number indicative of the date and time at the time when the separator original sheet is produced. The lot information can be the number given by the control device 92 to each separator roll in the order of storage as a stock in the stock apparatus 9.

Alternatively, the lot number can be given to each separator original sheet produced as one sheet (one continuous original sheet). In this case, slit separator rolls produced by cutting one separator original sheet are given the identical lot number and accordingly, slit separator rolls produced from different separator original sheets are given different lot numbers, respectively. By selecting and connecting separator rolls produced from different separator original sheets, a combination of separators can be more flexibly selected. This makes it possible to reduce the number of joints between separators for producing a separator roll having a prescribed length and also to reduce an amount of wasted separator of a length beyond the prescribed length.

At a desired time point, the user inputs, into the control device 92, an instruction to select (display) separators to be used in connecting separators (S3). The selecting section 98 of the control device 92 selects a combination of separators from among separators stored as stocks so that a separator obtained by connecting the separators in thus selected combination along the lengthwise direction will have a length which is equal to or longer than the prescribed length and the separators in the selected combination may be separators produced in production lots closer to each other. For example, from among combinations of two separators which have a length equal to or more than the prescribed length when connected, a combination of separators produced in production lots closest to each other is selected. In this way, the selecting section 98 selects the combination of the separators on the basis of the MD lengths and the lot information of the separators (S12).

Closer lot numbers indicates closer production lots. It is expected that closer production lots provides products having less varying qualities. In other words, by selecting a combination of separators produced in closer production lots, it is possible to connect separators having similar qualities (physical properties). This makes it possible to give more uniform quality to a resultant separator obtained by connecting such separators.

For example, a case where four separator rolls are stored as stocks is assumed. In this case, the four separators have lot numbers of #01 (480 m in MD length), #02 (700 m), #03 (200 m), and #04 (600 m) which are given in the order of production. Then, a combination of separator rolls having the lot numbers #01 (480 m) and #02 (700 m) is selected in a case where a prescribed MD width is 1000 m. This is because separators in such a combination can have a length equal to or more than 1000 m when connected, and in addition, the separator rolls selected have closer lot numbers. Note that in a case where it is expected that a length of no combination of two separators connected will reach the prescribed MD length, the selecting section 98 can select a combination of three separators.

The presentation section 99 causes the display panel 93 to display the numbers indicative of thus selected separators and a total MD length of the separators (S5).

Note that in both of the above selection flows 1 and 2, a user himself/herself can select a combination of separators to be connected, in accordance with the above conditions.

Embodiment 2

The following discusses another embodiment of the present invention. For convenience of the explanation, identical reference signs are given to members having functions identical to those of members having been discussed in Embodiment 1 above, and explanations of such members are omitted. Embodiment 1 above has discussed connecting separators that are produced mainly due to breakage. Meanwhile, there may be cases where a user intentionally cuts a separator.

In production steps of separators, a defect may occur in part of a separator. For example, in a produced separator (original sheet or slit separator), a hole (visible hole) having a size larger than a prescribed size and a portion containing a foreign substance are defects. The presence of such a defect may lead to non-uniform flow of lithium ions and deterioration of battery characteristics. Further, in a case where a large hole is present, breakage may occur from the hole in a case where tensile force is applied. Further, in a case where a separator contains a conductive foreign substance, the presence of the conductive foreign substance may affect battery production steps because separators are supposed to have insulating property. Therefore, in Embodiment 2, such a defect is removed from a produced separator.

Figure 12A:
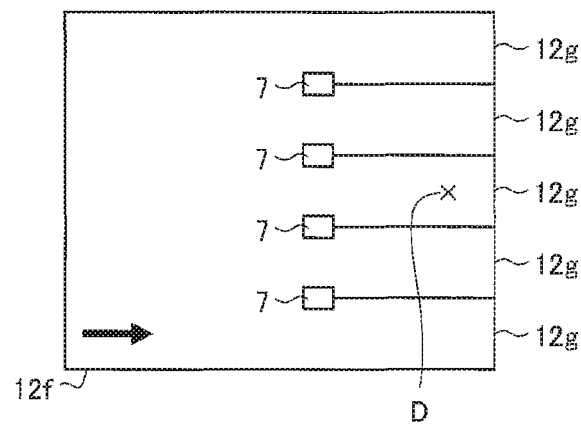
FIGS. 12A, 12B, 12C and 12D are diagrams illustrating an outline of the step of removing a defect.

FIGS. 12A, 12B, 12C, and 12D are diagrams illustrating an outline of the step of removing a defect. As illustrated in FIG. 12A, a separator 12f which is an original sheet is slit into slit separators 12g (here, five slit separators) by cutting devices 7. An arrow in FIGS. 12A, 12B, 12C and 12D indicates a flow direction (MD) of the separator. In FIGS. 12A, 12B, 12C and 12D, a defect D is denoted by X. In the case of FIGS. 12A, 12B, 12C and 12D, the defect D contained in the separator 12f which is an original sheet is to be contained in one of the slit separators 12g. The slit separators 12g having no defect is used as products each having a prescribed length and for example, a width of 150 mm.

Figure 12B:
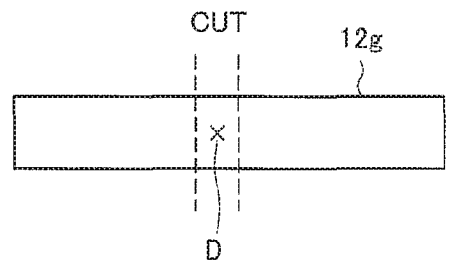

On the other hand, the slit separator 12g containing the defect D is cut along a transverse direction (TD), at positions preceding and following a position where the defect D is present in a lengthwise direction (FIG. 12B). This removes a portion where the defect D is present.

Figure 12C:
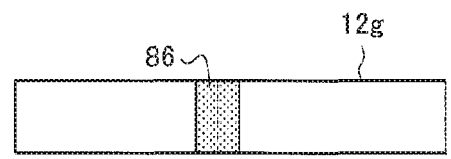

Thus cut pieces of the slit separator 12g preceding and following the position where the defect D is present are connected to each other with a non-conductive adhesive tape 86 (FIG. 12C). The processes of such cutting and connecting can be carried out automatically by machine or manually by a user.

Figure 12D:
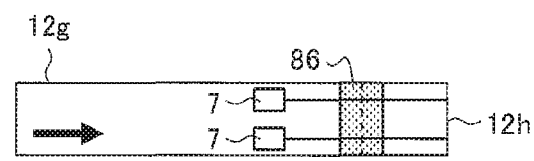

Thus connected pieces of the slit separator 12g are further slit into a thinner slit separator(s) by the cutting devices 7 (FIG. 12D). This results in a slit separator 12h obtained by cutting off respective widthwise ends of the slit separator 12g. The slit separator 12h obtained by cutting off the defect D and connecting cut pieces is used as a product (different product) having a prescribed length and, for example, a smaller width of 100 mm. As described above, in Embodiment 2, cut pieces of the slit separator 12g produced as one continuous sheet are connected to each other. Therefore, separators having similar qualities can be connected.

The defect D can be removed alternatively, for example, by cutting the separator 12f which is an original sheet along the transverse direction (TD). Thereafter, cut pieces of the separator 12f can be connected along the lengthwise direction.

However, the defect is contained in only one or some of the slit separators 12g. Therefore, wasted separator is reduced by removing the defect D from the one or some slit separators 12g with the defect D rather than from the separator 12f. Further, by further slitting the connected pieces of the slit separator 12g, the pieces of the slit separator 12g preceding and following a joint can have precisely the same width.

Note that the slit separator 12g obtained by connecting cut pieces of the slit separator 12g to each other can be further slit into thinner slit separators 12h. Alternatively, the slit separator 12g itself obtained by connecting cut pieces of the slit separator 12g can be used as a product.

CONCLUSION

A method according to an aspect of the present invention for producing a battery separator roll, includes: a connecting step of connecting two or more battery separators to each other along a lengthwise direction so that the battery separator roll is produced.

The above configuration makes it possible to obtain a longer battery separator roll by using short battery separator rolls produced due to, for example, breakage in production steps. This makes it possible to obtain a battery separator roll having a length suitable for production of application products.

The battery separators can be arranged to have lengths different from each other in the lengthwise direction, respectively.

Broken battery separators have different lengths. By connecting battery separators respectively having different lengths in the lengthwise direction, a longer battery separator roll can be obtained. Note that, of course, battery separators to be connected can have lengths substantially equal to each other in the lengthwise direction.

The above method can further include: a slitting step of slitting the two or more battery separators having been connected to each other, into one or more slit battery separators each having a prescribed width.

For example, in a case where slit battery separators are to be connected to each other along the lengthwise direction, it is difficult to connect the slit battery separators in a manner such that lengthwise directions of the slit battery separators are parallel to each other and positions of the slit battery separators are aligned in a transverse direction. In a case where parallelism of the lengthwise directions of the slit battery separators deteriorates or the positions of the slit battery separators are misaligned in the transverse direction, a wrinkle is produced or a side surface of the battery separator roll becomes uneven.

On the other hand, in the above configuration, after the battery separators are connected to each other, thus connected battery separators are slit into slit battery separators. This makes it possible to easily align, in the transverse direction, the positions of the battery separators preceding or following a joint between the battery separators. In addition, the lengthwise directions of the battery separator rolls are arranged to be the same. This makes it possible to easily prevent a wrinkle or unevenness from being produced.

The above method can be configured to further include: a slitting step of slitting one or more battery separators into the two or more battery separators each having a prescribed width, in the connecting step, the two or more battery separators obtained by slitting being connected to each other.

The above method can be configured such that: in the connecting step, the two or more battery separators each having a length less than a prescribed length are connected to each other along the lengthwise direction, so that the battery separator roll having the prescribed length is produced.

The above configuration makes it possible to obtain a battery separator roll of a prescribed length, by use of battery separators having a length less than the prescribed length, which battery separators are produced due to, for example, breakage in production steps.

The above method can be configured to further include: a cutting step of cutting off a defect contained in a battery separator, by cutting the battery separator in a transverse direction, in the cutting step, the battery separator being cut into two or more battery separators, and in the connecting step, the two or more battery separators produced in the cutting step being connected to each other along the lengthwise direction.

The above method can be configured to further include: a storing step of storing three or more stock battery separators each having a length less than a prescribed length; and a selecting step of selecting a combination of stock battery separators from combinations of stock battery separators among the three or more stock battery separators, the combination of the stock battery separators, in a case where the stock battery separators in the combination are connected to each other, having a length equal to or more than the prescribed length and closer to the prescribed length, as compared to other combinations of stock battery separators among the combinations of stock battery separators, the other combinations of stock battery separators each having a length equal to or more than the prescribed length in a case where the stock battery separators in each of the other combinations are connected to each other, in the connecting step, the stock battery separators in the combination selected being connected to each other along the lengthwise direction.

The above configuration makes it possible to reduce an amount of wasted separator of a length beyond a prescribed length. This makes it possible to usefully and efficiently use a conventionally discarded part of battery separators.

The above method can be arranged to further include: a storing step of storing three or more stock battery separators in association with lot information, the three or more stock battery separators each having a length less than a prescribed length; and a selecting step of selecting a combination of stock battery separators from combinations of stock battery separators among the three or more stock battery separators, the combination of the stock battery separators, in a case where the stock battery separators in the combination are connected to each other, having a length equal to or more than the prescribed length, the stock battery separators in the combination having been produced in production lots closer to each other as compared to stock battery separators in each of other combinations among the combinations of stock battery separators, the other combinations of stock battery separators each having a length equal to or more than the prescribed length in a case where the stock battery separators in each of the other combinations are connected to each other, in the connecting step, the stock battery separators in the combination selected being connected to each other along the lengthwise direction.

The above configuration makes it possible to obtain a battery separator roll which is uniform in quality, because the battery separators to be connected are produced in close lots.

The above method can be configured such that: in the connecting step, the two or more battery separators are connected to each other along the lengthwise direction with an adhesive tape.

A battery separator roll according to one aspect of the present invention includes two or more battery separators connected to each other along a lengthwise direction.

The battery separator roll can be arranged such that the two or more battery separators are connected to each other with an adhesive tape.

The battery separator roll can be arranged such that the two or more battery separators have lengths different from each other in the lengthwise direction, respectively.

The battery separator roll can be arranged such that the two or more battery separators have lengths substantially equal to each other in the lengthwise direction, respectively.

The battery separator roll can be arranged such that the above battery separators and the adhesive tape are slit after connecting the battery separators and the adhesive tape, so that the battery separators and the adhesive tape have the same width.

The battery separator roll can be arranged such that the two or more battery separators are obtained by cutting, in a transverse direction, a battery separator produced as one continuous sheet.

The battery separator roll can be arranged such that the adhesive tape has a tensile strength or a yield strength in the lengthwise direction which is greater than a tensile strength or a yield strength of the battery separators in the lengthwise direction.

In the above configuration, the adhesive tape can tolerate tensile force applied to the battery separator in subsequent production steps. This makes it unnecessary to change the tensile force in the subsequent production steps, in accordance with the presence or absence of the adhesive tape.

The battery separator roll can be arranged such that the adhesive tape includes a base made of a material that is the same as a material contained in the battery separators; and the adhesive tape has a thickness equal to or greater than a thickness of the battery separators.

In the above configuration, the adhesive tape is thicker than the battery separator. Accordingly, in a case where the adhesive tape and the battery separator have the same width, the strength of the adhesive tape is greater than the strength of the battery separator. Therefore, the adhesive tape can tolerate tensile force applied to the battery separator in subsequent production steps.

The thickness of the adhesive tape can be 140 μm or less.

The above configuration makes it possible to prevent a mark of a raised portion produced by the adhesive tape from remaining at a part except a position where the battery separator rolls are connected to each other.

The battery separator roll can be arranged such that: the adhesive tape has an adhesive force in the lengthwise direction which is greater than a pull force at which the battery separators break or yield.

In the above configuration, adhesion of the adhesive tape can tolerate tensile force applied to the battery separator in subsequent production steps. This makes it unnecessary to change the tensile force in the subsequent production steps for the purpose of preventing the adhesive tape from peeling off.

The adhesive tape can be configured to contain an acrylic adhesive.

The battery separator roll can be arranged such that: the adhesive tape has a portion adhered to one of the two or more battery separators, which portion is 25 mm or less in length in the lengthwise direction.

The battery separator roll can be arranged such that: the adhesive tape has a color that is different from a color of the battery separators.

The above configuration makes it possible to easily specify a joint of the battery separators, and therefore easily cut off the joint in a subsequent production step.

The number of joint where the adhesive tape is used to connect the two or more battery separators can be only one.

An apparatus according to one aspect of the present invention for producing a battery separator roll, includes: a stock section for storing stock battery separators each having a length less than a prescribed length; a selecting section for selecting a combination of stock battery separators from combinations of stock battery separators among the stock battery separators stored, the combination of the stock battery separators, in a case where the stock battery separators in the combination are connected to each other along a lengthwise direction, having a length equal to or more than the prescribed length and closer to the prescribed length as compared to other combinations of stock battery separators among the combinations of stock battery separators, the other combinations of stock battery separators each having a length equal to or more than the prescribed length in a case where the stock battery separators in each of the other combinations are connected to each other; and a presentation section for presenting, to a user, the combination of the stock battery separators selected.

An apparatus according to one aspect of the present invention for producing a battery separator roll, includes: a stock section for storing stock battery separators in association with lot information, the stock battery separators each having a length less than a prescribed length; a selecting section for selecting a combination of stock battery separators from combinations of stock battery separators among the stock battery separators stored, the combination of the stock battery separators, in a case where the stock battery separators in the combination are connected to each other along a lengthwise direction, having a length equal to or more than the prescribed length, the stock battery separators in the combination having been produced in production lots closer to each other as compared to stock battery separators in each of other combinations among the combinations of stock battery separators, the other combinations of stock battery separators each having a length equal to or more than the prescribed length in a case where the stock battery separators in each of the other combinations are connected to each other; and a presentation section for presenting, to a user, the combination of the stock battery separators selected.

The present invention is not limited to the embodiments, but can be altered by a skilled person in the art within the scope of the claims. An embodiment derived from a proper combination of technical means each disclosed in a different embodiment is also encompassed in the technical scope of the present invention.

INDUSTRIAL APPLICABILITY

The present invention is applicable to a battery separator roll, a method for producing the battery separator roll, and an apparatus for producing the battery separator roll.

REFERENCE SIGNS LIST 1 lithium-ion secondary battery
4 heat-resistant layer
6 slitting apparatus
7 cutting device
8 connecting apparatus
9 stock apparatus (production apparatus)
11 cathode
12, 12b to 12h separator (battery separator)
12a heat-resistant separator (battery separator)
13 anode
82b to 82e core
83 connecting table
86 adhesive tape
90 stock section
91a to 91e support bars (stock section)
92 control device (stock section)
93 display panel
94 operation panel
95 measuring section
96 input section
97 storage section
98 selecting section
99 presentation section

The invention claimed is:

1. A method for producing a battery separator roll, comprising:
   a first slitting step of slitting one or more battery separators into two or more battery separators having a prescribed first width;
   a connecting step of connecting the two or more battery separators obtained by slitting to each other along a lengthwise direction;
   a second slitting step of slitting a sheet of the two or more battery separators having been connected to each other, into a slit battery separator having a second prescribed width, so that the two or more battery separators are aligned in a transverse direction; and a cutting step of cutting off a defected contained in the slit battery separator after the second slitting step, by cutting the slit battery separator in a transverse direction, in the cutting step, the slit battery separator being cut into two or more cut battery separators.

2. The method as set forth in claim 1, wherein:

in the connecting step, the two or more battery separators each having a length less than a prescribed length are connected to each other along the lengthwise direction, so that the battery separator roll having the prescribed length is produced.

3. The method as set forth in claim 1, wherein:

the two or more battery separators have lengths different from each other in the lengthwise direction, respectively.

4. The method as set forth in claim 1, wherein:

in the connecting step, the two or more battery separators are connected to each other along the lengthwise direction with an adhesive tape.

* * * * *